United States Patent
Zaro et al.

(10) Patent No.: US 9,354,102 B2
(45) Date of Patent: May 31, 2016

(54) RESERVOIR ASSEMBLY FOR STORING HYDROGEN PEROXIDE FOR USE WITH A HYDROGEN PEROXIDE VAPORIZER IN ASSOCIATION WITH A FILLER

(71) Applicant: Scholle Corporation, Irvine, CA (US)

(72) Inventors: Christopher Zaro, Arlington Heights, IL (US); Sean Fitzgerald, West Dundee, IL (US)

(73) Assignee: Scholle IPN Corporation, Northlake, IL (US)

( * ) Notice: Subject to any disclaimer, the term of this patent is extended or adjusted under 35 U.S.C. 154(b) by 150 days.

(21) Appl. No.: 14/190,571

(22) Filed: Feb. 26, 2014

(65) Prior Publication Data

US 2014/0283931 A1 Sep. 25, 2014

Related U.S. Application Data

(60) Provisional application No. 61/769,455, filed on Feb. 26, 2013.

(51) Int. Cl.
*G01F 23/68* (2006.01)
*G01F 23/76* (2006.01)
*G01F 23/296* (2006.01)

(52) U.S. Cl.
CPC ............ *G01F 23/68* (2013.01); *G01F 23/2962* (2013.01); *G01F 23/76* (2013.01); *Y10T 137/8342* (2015.04)

(58) Field of Classification Search
CPC ... G01F 23/2962; G01F 23/68; G01F 23/683; G01F 23/686; G01F 23/76; Y10T 137/8158; Y10T 137/8342; Y10T 137/8359; A61L 2/208; A61L 2202/14; A61L 2/20; A61L 2/24; A61L 2/26; A61L 2202/24; A61L 2202/23; A61L 2202/11

See application file for complete search history.

(56) References Cited

U.S. PATENT DOCUMENTS

| | | | | |
|---|---|---|---|---|
| 2,233,235 A * | 2/1941 | Witthaus | ................. | G01F 23/76 137/228 |
| 2,678,074 A * | 5/1954 | Adams | .................... | F16K 33/00 116/228 |
| 3,974,857 A * | 8/1976 | Hehl | ...................... | B29C 45/72 137/271 |
| 5,054,319 A * | 10/1991 | Fling | ...................... | G01F 23/72 250/577 |
| 5,408,874 A * | 4/1995 | Fleck, Sr. | ............ | G01F 23/2962 367/908 |

(Continued)

FOREIGN PATENT DOCUMENTS

EP 2108379 A1 10/2009

*Primary Examiner* — Matthew W Jellett
(74) *Attorney, Agent, or Firm* — The Watson I.P. Group, PLC; Jovan N. Jovanovic; Vladan M. Vasiljevic (57) ABSTRACT

The disclosure is directed to reservoir assembly for storing hydrogen peroxide for use with a hydrogen peroxide vaporizer in association with a filler. Which includes a fluid chamber, a float member and a column level sensor. The float member is positioned within the fluid chamber. The fluid column level sensor is positioned at or near the upper end of the fluid chamber. The float member is configured to absorb the vibrations, turbulence and bubbling caused by the fluid movement and degradation. To that end, the float member is configured so as to be partially submerged. In addition, the float member includes an outer surface that has both passageways and sidewall guide surfaces which facilitate proper tracking within the fluid chamber, while also allowing for the directing of fluid movements around the float.

16 Claims, 4 Drawing Sheets

(56) References Cited

U.S. PATENT DOCUMENTS

| | | | | |
|---|---|---|---|---|
| 5,743,138 A * | 4/1998 | Cheng | ................. | G01F 1/22 73/305 |
| 7,399,985 B2 * | 7/2008 | Mruk | ................. | G01F 23/686 250/577 |
| 8,431,077 B2 * | 4/2013 | Goncalves | ................. | A61L 2/208 422/28 |
| 2007/0181703 A1 | 8/2007 | Buchanan et al. | | |
| 2010/0163567 A1 * | 7/2010 | Chiang | ................. | A47G 23/16 220/703 |

* cited by examiner

RESERVOIR ASSEMBLY FOR STORING HYDROGEN PEROXIDE FOR USE WITH A HYDROGEN PEROXIDE VAPORIZER IN ASSOCIATION WITH A FILLER

CROSS-REFERENCE TO RELATED APPLICATION

This application claims priority from U.S. Provisional Patent App. Ser. No. 61/769,455 filed Feb. 26, 2013, entitled "Fluid Level Sensor For Hydrogen Peroxide Vaporizers," the entire specification of which is hereby incorporated by reference.

BACKGROUND OF THE DISCLOSURE

1. Field of the Disclosure

The invention relates in general to a reservoir with a fluid level sensor, and more particularly, to reservoir assembly for storing hydrogen peroxide for use with a hydrogen peroxide vaporizer in association with a filler. In such an environment, vibration and other shock is present, as is bubbling from the fluid itself.

2. Background Art

The use of level sensors for measuring the quantity of fluid in a reservoir, and, in turn, the rate of consumption are known in the art. It has proven difficult to efficiently and inexpensively compute the consumption of fluids which are used at relatively slow rates, especially in environments which are subject to vibrations and shock as well as bubbling or other emissions from the fluid itself.

One area where fluid sensing is very important, but difficult to measure is in association with hydrogen peroxide vaporizers. Such vaporizers are used in different disinfecting operations. In the contemplated embodiment, a hydrogen peroxide vaporizer is used in association with filling equipment which fills flexible packages with a flowable material (typically for use in a bag in box package, but not limited thereto). The disclosure is not limited to use in association with a hydrogen peroxide vaporizer used with such filling equipment, and, the environment is disclosed solely for exemplary and illustrative purposes. It will be understood that hydrogen peroxide will refer to a solution which has hydrogen peroxide in a desired concentration.

In such an environment as a hydrogen peroxide vaporizer, the use of hydrogen peroxide is relatively slow, and, it is often difficult to determine if the system is operating properly. For example, the use of hydrogen peroxide is on the order of approximately less than 2 to 30 grams per minute, although not limited thereto. Additionally, in such environments, generated hydrogen peroxide bubbles, as gas is released. Such release of gas is detrimental the accuracy and response time of the measuring devices.

SUMMARY OF THE DISCLOSURE

The disclosure is directed to reservoir assembly for storing hydrogen peroxide for use with a hydrogen peroxide vaporizer in association with a filler. Which includes a fluid chamber, a float member and a column level sensor. The float member is positioned within the fluid chamber. The fluid column level sensor is positioned at or near the upper end of the fluid chamber.

The float member is configured to absorb the vibrations and turbulence caused by the fluid movement and degradation as well as allowing bubbles to pass thereacross. To that end, the float member is configured so as to be partially submerged. In addition, the float member includes an outer surface that has both passageways and sidewall guide surfaces which facilitate proper tracking within the fluid chamber, while also allowing for the directing of fluid movements around the float.

More particularly, the disclosure is directed to a reservoir assembly for storing hydrogen peroxide for use with a hydrogen peroxide vaporizer in association with a filler. The reservoir assembly comprising a fluid chamber, a float member and a fluid column level sensor. The fluid chamber has an elongated body with an inner surface having a substantially uniform cross-sectional configuration along at least a portion thereof, and a lower end and an upper end. The float member is positioned within the fluid chamber and slidably movable toward and away from each of the lower end and the upper end of the elongated body. The float member has a target region at a top surface thereof, and an outer surface structurally configured to define a plurality of passageways between the outer surface of the float member and the inner surface of the fluid chamber. At least one sidewall guide surface is configured to generally slidably interface and guide the float member in slidable movement along the inner surface of the elongated body. The float member having a density such that the float member is at least partially submerged hydrogen peroxide when hydrogen peroxide is placed within the fluid chamber. At the same time, at least the target region remains above the level of the hydrogen peroxide. The fluid column level sensor is positioned at a top end of the fluid chamber. The sensor is configured to determine the position of the float member by interfacing with the target region of the float member.

In a preferred embodiment, the fluid chamber comprises an elongated cylindrical member, at least a portion of which includes a substantially uniform circular cross-sectional configuration.

In a preferred embodiment, the float member comprises a shape mating configuration having a plurality of sidewall guide surfaces that are spaced apart from each other. Each of the sidewall guide surfaces is configured to slidably interface and guide the float member in slidable movement along the inner surface of the elongated body. A passageway is defined therebetween.

In another preferred embodiment, the sidewall guide surfaces include at least one flute extending along the length thereof.

Preferably, the float member comprises four spaced apart sidewall guide surfaces, with a flat region extending between each of the sidewall guide surfaces.

In some such embodiments, each of the sidewall guide surfaces includes at least one flute extending along the length thereof.

In another embodiment, a plug member having a higher density than the float member is coupled to the float member.

In another embodiment, the float member is at least 70% submerged within a hydrogen peroxide. In some such embodiments, the float member is at least 90% submerged within the hydrogen peroxide.

In another preferred embodiment, the outer surface of the float member and the inner surface of the fluid chamber define a plurality of passageways defining a cross-sectional area, wherein a cross-sectional area of the passageways comprise less than 35% of the cross-sectional area of the inner surface of the fill chamber.

Preferably, the cross-sectional area of the passageways is approximately 12.5% of the cross-sectional area of the fill chamber.

In another preferred embodiment, the float member is permitted to rotate about an axis of rotation that is generally substantially perpendicular to the target region. At the same time, the float member is precluded from substantial rotation about an axis an axis of rotation that is orthogonal or oblique thereto.

In another preferred embodiment, the reservoir assembly further comprises a manifold including at least one circulation metering pump outlet port, at least one recirculation inlet port, a reservoir refill port and a chamber port. The lower end of the fluid chamber is sealingly coupled to the chamber port, and in fluid communication with each of the outlet port, the inlet port, and the reservoir refill port.

In another preferred embodiment, an overflow sensor is positioned proximate the fluid chamber and spaced apart from the upper end of the fluid chamber. A low level sensor positioned proximate the fluid chamber and spaced apart from the lower end of the fluid chamber, and positioned between the overflow sensor and the lower end of the fluid chamber.

In another preferred embodiment, at least a portion of the fluid chamber is transparent, to, in turn, allow for visually identifying the position of the float slidably movable therewithin.

Preferably, the fluid column level sensor comprises an ultrasonic sensor.

In another preferred embodiment, the float member comprises a polymer.

BRIEF DESCRIPTION OF THE DRAWINGS

The disclosure will now be described with reference to the drawings wherein.

DETAILED DESCRIPTION OF THE DISCLOSURE

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
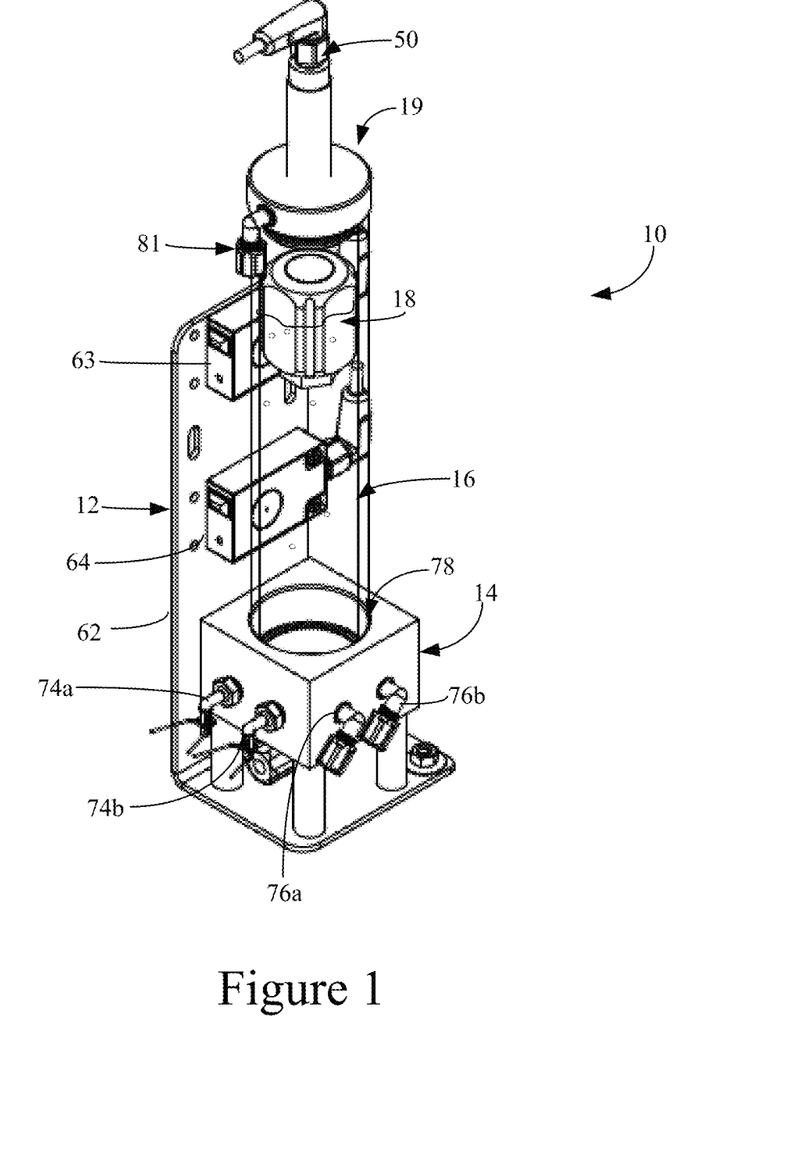
FIG. 1 of the drawings is a perspective view of the reservoir assembly for storing hydrogen peroxide for use with a hydrogen peroxide vaporizer in association with a filler of the present disclosure.
Figure 2:
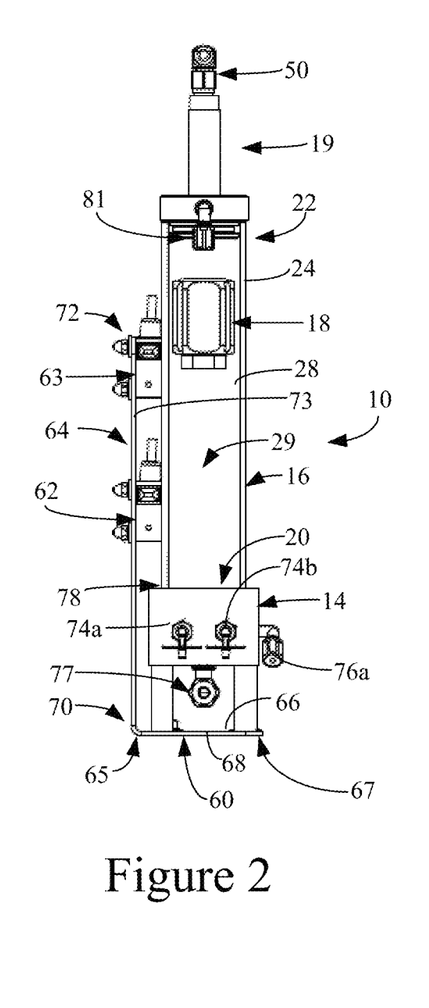
FIG. 2 of the drawings is a side elevational view of the reservoir assembly of the present disclosure.
Figure 3:
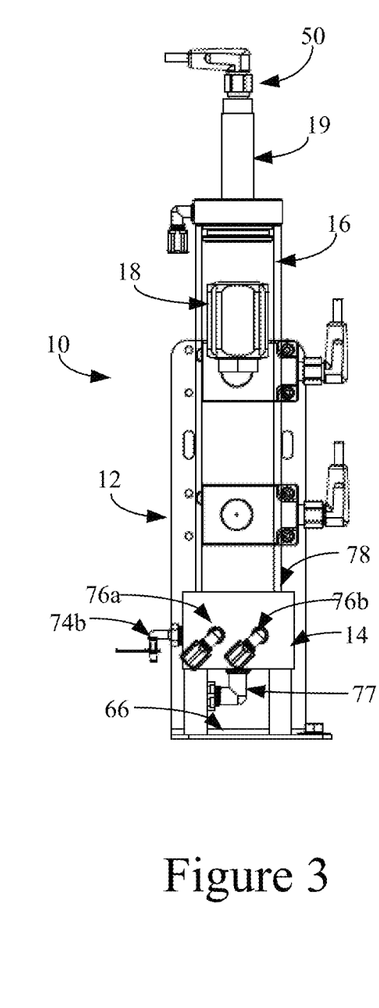
FIG. 3 of the drawings is a front elevational view of the reservoir assembly of the present disclosure.
Figure 4:
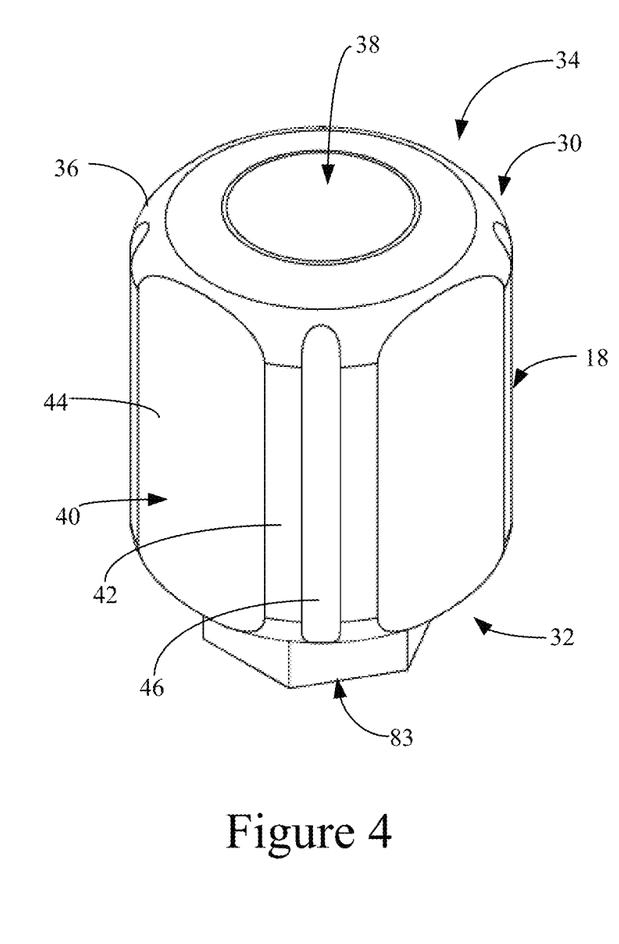
FIG. 4 of the drawings is a perspective view of the float member which is positioned within the fluid chamber of the reservoir assembly of the present disclosure.
Figure 5:
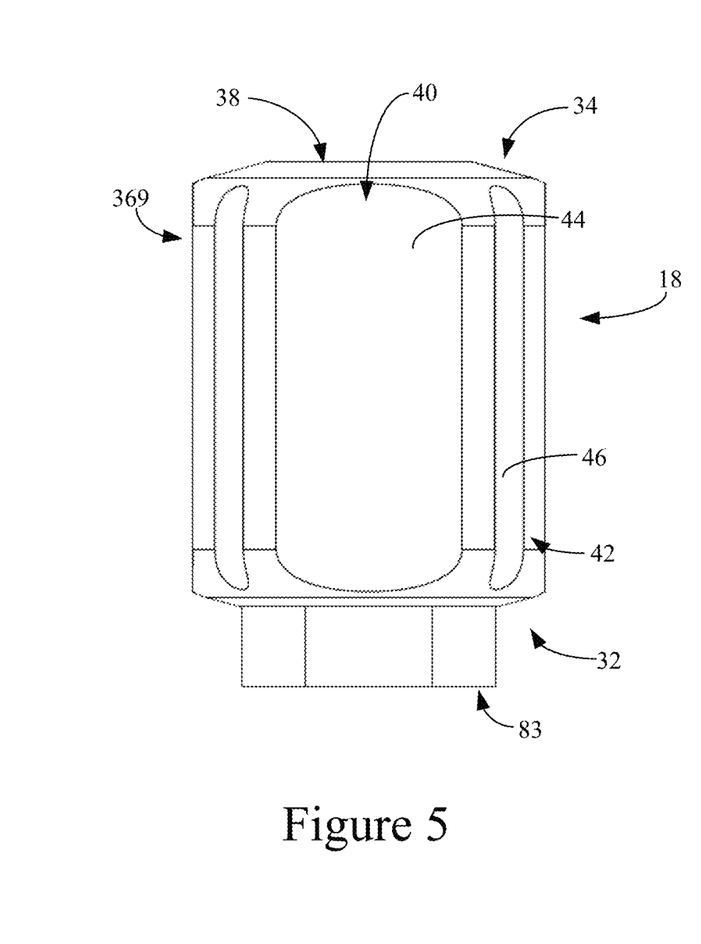
FIG. 5 of the drawings is a side elevational view of the float member of FIG. 4.

Referring now to the drawings and in particular to FIGS. 1, 2 and 3, the reservoir assembly 10 for hydrogen peroxide pumps in a filler is shown as comprising base 12, manifold 14, fluid chamber 16, float member 18 and sensor 19. The level sensor assembly 10 is configured for use in association with hydrogen peroxide vaporizer (not shown). The hydrogen peroxide vaporizer is coupled to filling equipment (not shown), such as, for example, filling equipment available from Scholle Corporation of Irvine, Calif. for filling flexible containers. Of course, the system is not limited to use in association with such a filler, or use in association with a filler of a particular type or manufacturer. Instead, it will be understood that the reservoir assembly may be utilized with any one of a number of different types of equipment, and that the foregoing is for illustrative purposes only.

The base 12 is shown in FIGS. 1, 2 and 3 as comprising a mounting plate which includes lower plate 60 and upstand portion 62. The lower plate and the upstand portion are generally perpendicular to each other with the upstand portion extending substantially vertically and the lower plate extending substantially horizontally. The base is coupled to, for example, the hydrogen peroxide vaporizer, although it is not limited thereto. The lower plate includes upper surface 66, lower surface 68, which span from proximal end 65 to distal end 67. The upstand portion includes inner surface 73, proximal end 70 and distal end 72. The proximal end 70 and the proximal end 65 generally meet. An overflow sensor 63 is positioned along the inner surface 73, and a low level sensor 64 is positioned along the inner surface 73 spaced apart from the overflow sensor 63 and toward the proximal end 70 of the upstand portion 62. As will be explained below in greater detail, the overflow sensor is triggered if the pump that is configured to fill the reservoir stops pumping (because the reservoir is filled to its desired full level). In the event that the level is at or below the low level sensor, the low level sensor is triggered and the system stops (as the system is sensing that no fluid is in the reservoir).

With continued reference to FIGS. 1, 2 and 3, the manifold 14 is configured for directing fluid in an out of the fluid chamber 16 (with the exception of overflow port 81 which allows fluid to exit from the fluid chamber in the event of a fault condition wherein the chamber is overfilled). The manifold 14 is mounted to the base 12, and in particular, the manifold is mounted to the lower plate 60 on the upper surface 66 thereof. In the embodiment shown, a plurality of stilts elevate the manifold from the upper surface 66 of the lower plate 60. The manifold 14 includes circulation metering pump ports 74a, 74b, recirculation inlet ports 76a, 76b, reservoir fill port 77 and chamber port 78. In the embodiment shown, a pair of metering pumps are contemplated for use. In such a configuration, each of the metering pumps is coupled to one of the circulation metering pump outlet ports and the recirculation inlet port. In other embodiments, where only a single metering pump is provided, a single circulation metering pump port and recirculation inlet port may be provided on the manifold. The reservoir fill port 77 is coupled to a refilling pump that is coupled to a larger supply vessel. As will be explained below, the fill chamber is refilled through the reservoir fill port 77 (and in conjunction with the overflow sensor 63, in some embodiments).

The chamber port 78 provides a mounting mechanism to the fluid chamber and places the fluid chamber in fluid communication with the circulation metering pump ports 74a, 74b, recirculation inlet ports 76a, 76b and reservoir fill port 77. In the embodiment shown, the chamber port is sized so as to correspond to the cross-sectional configuration of the fluid chamber. It will be understood that the fluid chamber and the chamber port 78 are sealed in a fluid tight configuration. The position of the chamber port 78 is such that the fluid chamber extends in a generally vertical direction along the inner surface 73 of the upstand portion 62 and spaced apart therefrom so as to provide location for the overflow sensor and the low level sensor.

Referring to FIG. 2, the fluid chamber 16 includes lower end 20, upper end 22 and sidewall 24. The sidewall 24 defines an inner surface 28 having an inner cross-sectional configuration 29. It will be understood that the fluid chamber may house the hydrogen peroxide that is needed for several hours of operation, or greater or lesser hours of operation (i.e., 10-30 minutes for example). In other embodiments, a larger tank may be provided that can refill the fluid chamber. As set forth above, the refilling of the fluid chamber can be achieved through the reservoir refill port 77.

In the embodiment shown, the inner cross-sectional configuration is substantially uniformly circular. In other embodiments, other shapes are contemplated, and typically, other shapes wherein through the operable range, the cross-sectional configuration is substantially uniform, at least along an operating portion of the slidable movement of the float member. For example, an oval or multi-sided (i.e., square, octagonal, etc.) are likewise contemplated. In certain embodiments, the fluid chamber comprises a polymer member (one that does not promote the release of gas from hydrogen peroxide). In certain embodiment, it is advantageous to make the chamber from a transparent material (i.e., clear polymer or glass) to allow for easy visual inspection of the level of fluid therewithin (at least partially along the travel portion of the float member sufficient to see the same).

While various configurations are contemplated for use, the fluid chamber, it is contemplated has a capacity of about a liter (and in this case is market for 798.0 ml). The configuration is substantially uniform from the lower end to the upper end. Other configurations are contemplated, and the configuration shown is merely exemplary. It will be understood that it is emptied in quick withdrawals (less than 5 seconds in duration, and of less than 30 g of fluid). Thus, small and quick removals of fluid are contemplated. Of course a number of different configurations are contemplated, including configurations wherein the bore is relatively smaller and the stroke is relatively larger. Such a configuration provides for increased sensitivity, as less volume is required to cause measurable movement of the float within the fluid chamber.

Positioned within the fluid chamber is float member 18. With reference to FIGS. 4 through 7, the float member 18 includes body 30 having bottom 32, top 34 and outer surface 36. The top 34 includes sensor target region 38. Such a region may comprise a flattened region, a polished region, a particular surface configuration or another configuration which enhances the receipt and reflection of ultrasonic pulses or beams (or other sensing waves, pulses or beams) from the fluid column level sensor 16. Advantageously, and as will be explained, the top 34 is substantially free of hydrogen peroxide such that a good target is given for the sensor. In the embodiment shown, the float member has a height of approximately 65 mm and has a diameter (as the configuration is substantially circular) of approximately 67.5 mm (with flats of approximately 58 mm thereacross). The diameter closely matches that of the fluid chamber, as will be explained. In another embodiment, the reservoir may have a smaller volume of 306.6217 ml and the float member may have a height of 44.5 mm with a diameter of 39.5 mm and a distance of 34.9 across the opposing flats.

While a number of different materials are contemplated, it is contemplated that the float member 18 comprises a substantially solid polymer body, and preferably a PVC (such as a PVC Type 2), with a hollowed out inner portion (to facilitate proper submersion within the fluid). Of course other materials and configurations (partially hollow, etc.) are likewise contemplated for use, as long as their buoyancy is known relative to the fluid, and fits within desired design constraints. In addition, a weight or other item (commonly referred to as a plug 83) may be positioned within the hollowed out inner portion so as to achieve the desired weight (i.e., weight of different density, generally greater, than the remainder of the float member). The particular material selected in the configured shape has a buoyancy that renders the overall float partially submerged. The partially submerged configuration provides improved ability to dampen the undesirable turbulence and vibration effects, to minimize undesirable movement of the float. In the particular embodiment, a majority of the float is submerged, such that the target remains above the fluid level and generally dry. It is contemplated that by volume, over 70% and preferably over 85%, and most preferably over 90% of the volume of the float is submerged.

The outer surface 36 is configured with a plurality of passageways, such as passageway 40 and a plurality of sidewall guide surfaces 42. The sidewall guide surfaces 42 are configured to interface with the fluid chamber and to both slidably interface and guide the float member along the inner surface 28 of the guide wall, without jamming or snagging, and also to dampen movements of the fluid through vibration and the like. As such, the sidewall guide surfaces are arcuate so as to generally correspond to the inner surface 28 of the fluid chamber 16. As the embodiment shown comprises a uniformly circular configuration, the float can is permitted to rotate about an axis of rotation that is generally substantially perpendicular to the target region. At the same time, the float member is precluded from substantial rotation about an axis an axis of rotation that is orthogonal or oblique thereto, and, therefore is limited to a rocking motion or slight pivoting through a small angular displacement (i.e., rocking motion).

As the fluid will tend to bubble and also may rock due to the vibrations and turbulence, the passageways 40 include flat regions, such as flat regions 44 and flutes, such as flutes 46. The flat regions 44 are positioned on either side of the sidewall guide surfaces 42, and tend to give the configuration of the float member a more square cross-sectional configuration. That is, the flat regions generally span a distance greater than the length of the sidewall guide surfaces 42. The flutes 46 extend within the sidewall guide surfaces, essentially vertically bisecting the same into two generally parallel sidewall guide surface portions. The flutes may be omitted, as desired. The flutes 46 in the embodiment shown generally comprise hemispherical cross-sectional configurations having a depth that is greater than the maximum distance between the flat regions and the inner surface of the fluid chamber. Additional flutes may be disposed along the sidewall guide surfaces.

Figure 6:
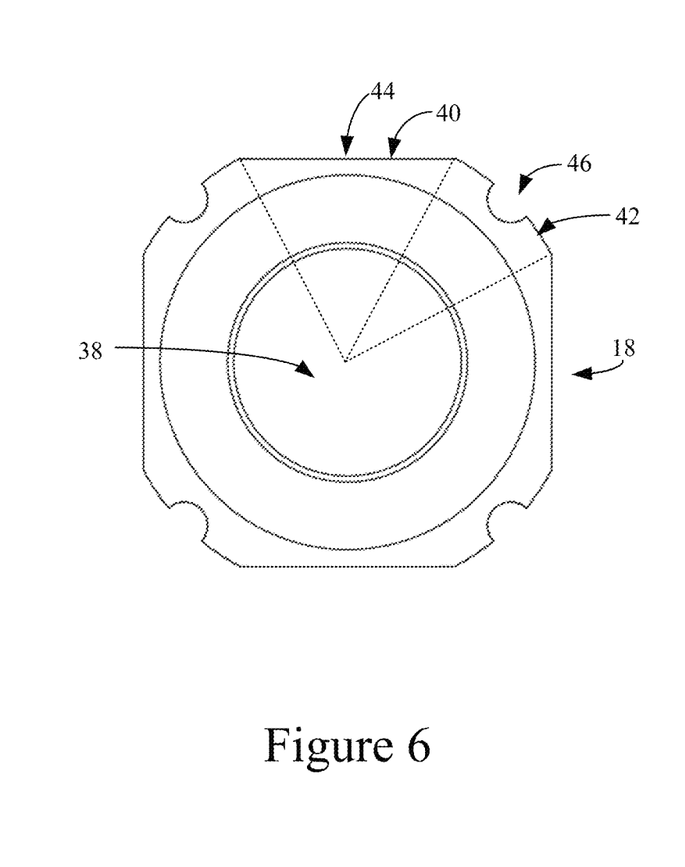
FIG. 6 of the drawings is a top plan view of the float member of FIG. 4, showing, in particular, the four portions, each of which are divided into two portions, a triangle portion and a slice portion, the four larger portions are symmetrically disposed four times about the circumference of the float member.
Figure 7:
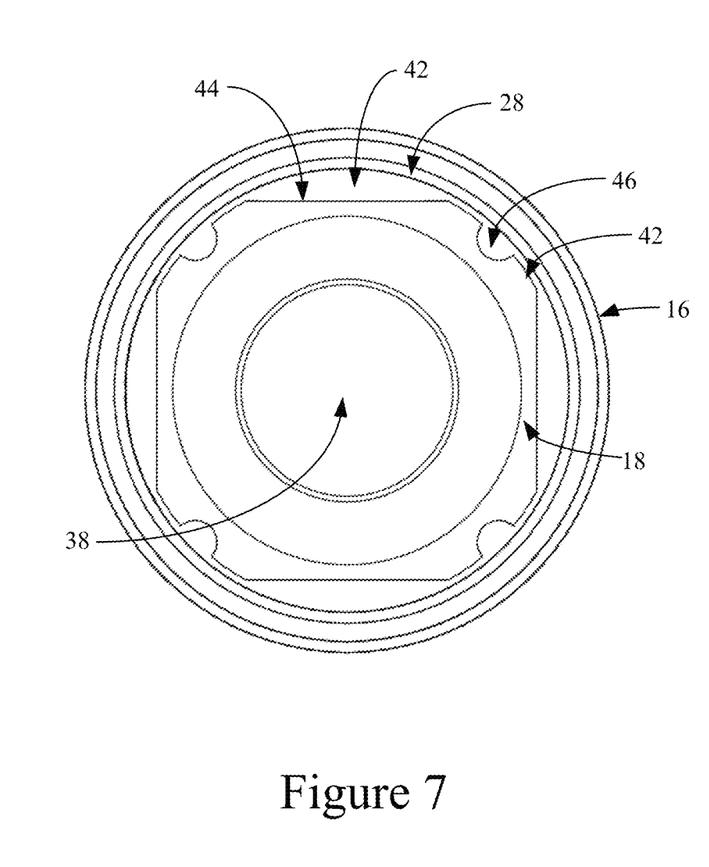
FIG. 7 of the drawings is a top plan view of the float member of FIG. 4, as positioned within the fluid chamber, showing, in particular, the interface between the sidewall guide surfaces and the voids/passageways created by the flutes and the flat regions 44.

In the embodiment shown, the float can be divided into four portions, with each portion being approximately 90° of arc formed by a triangle portion and a slice portion having a hemispherical void at the distal end thereof. The triangle portion extends for approximately 55° to 60° of arc with the slice portion comprising between 30° and 35° of arc. From a perfect circle, it can be seen that two voids are formed, one of which is the area between the triangle portion and the continued arc of the adjoining slice portions. The second void is the hemispherical void within the slice. It is desirable that fluid is permitted around the float member between the float member and the inner surface of the fluid chamber. The voids that are defined by the first and second void generally comprise approximately 12.5% of the cross-sectional area of a circle having a diameter that corresponds to the four slice portions. It will be understood that such voids are preferably symmetrical in a space apart orientation and generally comprise approximately between 6% and 35% of the cross-sectional area of a circle having a diameter that corresponds to the four slice portions. In the embodiment shown, the areas are defined by two voids that each repeat four times. It will be understood that the voids may be modified in size and configuration. It is likewise contemplated that the flats may be modified so that a plurality of flats are formed. In still other embodiments, the structure may be modified so that the slices have a larger arcuate configuration, with the flats being of a smaller arcuate configuration. Other configurations are contemplated (i.e., greater or fewer sidewall guide surfaces), such as two or more sidewall guide surfaces, and preferably three or more sidewall guide surfaces. Such configurations allow the float member to remain buoyant with the target in the proper orientation (i.e., not listing and snagging against the fluid chamber). In the embodiment shown, the float member may have a square cross-sectional configuration (due to the relative size of the walls 44, however, it is contemplated that the cross-sectional configuration may be a triangle, a polygon, such as a pentagon, hexagon, octagon or the like, or a football like shape having passageways that are not defined by any linear features.

With reference to FIG. 1, the fluid column level sensor 19 is positioned proximate the upper end 22 of the fluid chamber, above the predicted travel of the float member. The fluid column level sensor 16 may be incorporated into a cap at the upper end 22 and includes ultrasonic sensor 50. The ultrasonic sensor relies upon transmitting a signal and waiting for its return to determine the distance that is travelled by the signal. In turn, the position of the surface which reflected the signal back to the sensor can be determined. In the embodiment shown, the ultrasonic sensor 50 directs ultrasonic signals at the float member, and in particular at the target region 38 thereof. The sensor is coupled to an electronic circuit (not shown) which analyzes the signals received by the sensor. Such circuits are well known to those of skill in the art. The information that is processed from the signals can then be transmitted to a display or other device for viewing and analysis by an operator. A preferred embodiment utilizes a Schneider Electric Model SM656A44801 sensor or a Baumer Model UNAR 18U6912/S41G. The disclosure is not limited to the foregoing sensors, or sensor types. It is contemplated that other sensors may be positioned in a similar location and the sensor described is but exemplary of the sensors that can be utilized.

In operation, the level sensor assembly 10 is coupled to a hydrogen peroxide vaporizer 100. The base is typically coupled to the chassis of the hydrogen peroxide vaporizer or the filler. The manifold 14 is then coupled to the base. The fluid chamber 16 is coupled to the chamber port 78 and in a fluid tight seal therewith. The circulating metering pump outlet ports 74a, 74b are coupled to the respective inlets of the metering pumps (with one port coupled to each one of the two, in this case, metering pumps). The recirculating inlet ports 76a, 76b are coupled to the recirculation ports of the respective metering pumps. It is desired that the metering pumps retain a constant charge of fluid, and, as such, fluid recirculates relative to the reservoir assembly.

Next, reservoir refill port 77 is coupled to the remote tank of hydrogen peroxide (and the pump to pump the hydrogen peroxide into the manifold and fluid chamber. Finally, the overflow port is coupled to a tank, in the event that the fluid chamber becomes overfilled, the excess fluid precludes flooding in the electrical enclosure where the assembly is located. Once the fluid ports are properly coupled to the outside equipment, it is necessary to couple the electrical couplings. In particular, the overflow sensor 63 and the low level sensor 64 are coupled to the respective ones of the electrical circuitry.

Once all of the connections have been made, it is possible to fill the fluid chamber with hydrogen peroxide from the outside or remote larger reservoir. This is accomplished by way of a pump (not shown) that directs fluid into the reservoir refill port 77 of the manifold 14. The pump continues to direct fluid (and a valve may be present) until the overflow sensor is triggered indicating that the reservoir is filled. In other embodiments, other sensors may be utilized to confirm that the fluid chamber has been filled.

As the hydrogen peroxide is filled into the fluid chamber, the float 18 rises therewith. It will be understood that hydrogen peroxide may release gas through bubbles, which are directed to escape beyond the float member by way of the voids present between the float member and the inner surface of the fill chamber. At the same time, once the user activates one (or both) of the metering pumps, fluid is being withdrawn through the respective ones of the circulation metering pump outlet ports and returned through the recirculation inlet ports. As a result, fluid is both withdrawn and returned such that a constant changing of the levels while the metering pumps is realized. Additionally, this movement of fluid renders the fluid within the chamber to be somewhat turbulent in that it may slosh within the chamber.

Due to the partial submersion improved stability and improved response to outside vibration dampening and turbulence mitigation is realized. As the fluid sits within the fluid chamber, even when the equipment is static, a certain amount of gas will bubble out of the hydrogen peroxide. Advantageously, those bubbles can extend through the passageways 40 that extend through the float member 18. A vent can be provided proximate the upper end 22 of the fluid chamber to accommodate the venting, as well as overflow. The passage of the gas, rather than the trapping thereof also promotes the steadiness of the float member 18 within the fluid chamber 16.

With the hydrogen peroxide vaporizer running, and with the hydrogen peroxide being withdrawn for use by the filling equipment through the outlet 26 and into tubing 112, the level of fluid within the fluid chamber is constantly varying and also constantly changing. The variations due to vibration and bubbling need to be minimized so that the changes in the fluid level can be measured with the necessary accuracy. For this reason, the larger passageways, which includes the flat regions 44, accommodate the sloshing of liquids and the release of bubbles without substantially affecting the level of the float. Thus, accurate measurements can be taken by the ultrasonic sensor is such a configuration.

To measure the level, the ultrasonic sensor sends out an ultrasonic wave that bounces off the target region 38 and reflects back to the sensor. The sensor can then determine the position of the float. From the position of the float, the amount of fluid within the chamber can be determined (and, thus, a change in that level of fluid since the last measurement). Thus, absolute fluid quantity and changes can be measured by the ultrasonic sensor. There may be an opening on the top that allows for the introduction of more fluid, such as, for example, when the fluid has reached a level where it is desirable to refill the same.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A reservoir assembly for storing hydrogen peroxide for use with a hydrogen peroxide vaporizer in association with a filler, the reservoir assembly comprising:
   a fluid chamber having an elongated body with an inner surface having a substantially uniform cross-sectional configuration along at least a portion thereof, the fluid chamber defining a lower end and an upper end;
   a float member positioned within the fluid chamber and slidably movable toward and away from each of the lower end and the upper end of the elongated body, the float member having a target region at a top surface thereof, and an outer surface structurally configured to define a plurality of passageways between the outer surface of the float member and the inner surface of the fluid chamber, with at least one sidewall guide surface configured to generally slidably interface and guide the float member in slidable movement along the inner surface of the elongated body, the float member having a density such that the float member is at least partially submerged hydrogen peroxide when hydrogen peroxide is placed within the fluid chamber, while at least the target region remains above the level of the hydrogen peroxide;
   a fluid column level sensor positioned at the upper end of the fluid chamber, the sensor configured to determine the position of the float member by interfacing with the target region of the float member; and
   an overflow sensor positioned proximate the fluid chamber and spaced apart from the upper end of the fluid chamber and a low level sensor positioned proximate the fluid chamber and spaced apart from the lower end of the fluid chamber, and positioned between the overflow sensor and the lower end of the fluid chamber.

2. The reservoir assembly of claim 1 wherein the fluid chamber comprises an elongated cylindrical member, at least a portion of which includes a substantially uniform circular cross-sectional configuration.

3. The reservoir assembly of claim 2 wherein the float member comprises a shape mating configuration having a plurality of sidewall guide surfaces that are spaced apart from each other, each of the sidewall guide surfaces configured to slidably interface and guide the float member in slidable movement along the inner surface of the elongated body, with, a passageway defined therebetween.

4. The reservoir assembly of claim 3 wherein the sidewall guide surfaces include at least one flute extending along the length thereof.

5. The reservoir assembly of claim 3 wherein the float member comprises four spaced apart sidewall guide surfaces, with a flat region extending between each of the sidewall guide surfaces.

6. The reservoir assembly of claim 5 wherein each of the sidewall guide surfaces includes at least one flute extending along the length thereof.

7. The reservoir assembly of claim 1 wherein a plug member having a higher density than the float member is coupled to the float member.

8. The reservoir assembly of claim 1 wherein the float member is at least 70% submerged within the hydrogen peroxide.

9. The reservoir assembly of claim 8 wherein the float member is at least 90% submerged within the hydrogen peroxide.

10. The reservoir assembly of claim 1 wherein the outer surface of the float member and the inner surface of the fluid chamber define a plurality of passageways defining a cross-sectional area, wherein a cross-sectional area of the passageways comprise less than 35% of the cross-sectional area of the inner surface of the fill chamber.

11. The reservoir assembly of claim 10 wherein the cross-sectional area of the passageways is approximately 12.5% of the cross-sectional area of the fill chamber.

12. The reservoir assembly of claim 1 wherein the float member is permitted to rotate about an axis of rotation that is generally substantially perpendicular to the target region, while precluded from substantial rotation about an axis of rotation that is orthogonal or oblique thereto.

13. The reservoir assembly of claim 1 further comprising a manifold including at least one circulation metering pump outlet port, at least one recirculation inlet port, a reservoir refill port and a chamber port, with the lower end of the fluid chamber being sealingly coupled to the chamber port, and in fluid communication with each of the outlet port, the inlet port, and the reservoir refill port.

14. The reservoir assembly of claim 1 wherein at least a portion of the fluid chamber is transparent, to, in turn, allow for visually identifying the position of the float slidably movable therewithin.

15. The reservoir assembly of claim 1 wherein the fluid column level sensor comprises an ultrasonic sensor.

16. The reservoir assembly of claim 1 wherein the float member comprises a polymer.

* * * * *